(12) United States Patent
Dobusch

(10) Patent No.: US 8,624,694 B2
(45) Date of Patent: Jan. 7, 2014

(54) RESIDUAL-CURRENT CIRCUIT BREAKER

(75) Inventor: Gerhard Dobusch, Vienna (AT)

(73) Assignee: Eaton Industries (Austria) GmbH, Schrems (AT)

( * ) Notice: Subject to any disclaimer, the term of this patent is extended or adjusted under 35 U.S.C. 154(b) by 0 days.

(21) Appl. No.: 13/635,783

(22) PCT Filed: Mar. 9, 2011

(86) PCT No.: PCT/AT2011/000114
§ 371 (c)(1),
(2), (4) Date: Nov. 14, 2012

(87) PCT Pub. No.: WO2011/113072
PCT Pub. Date: Sep. 22, 2011

(65) Prior Publication Data
US 2013/0120091 A1 May 16, 2013

(30) Foreign Application Priority Data

Mar. 19, 2010 (AT) ..................................... 450/2010

(51) Int. Cl.
*H01H 73/12* (2006.01)
*H01H 73/00* (2006.01)
*H01H 83/06* (2006.01)
*H02H 3/00* (2006.01)
*H02H 9/08* (2006.01)

(52) U.S. Cl.
USPC ............................................. 335/18; 361/42

(58) Field of Classification Search
USPC .............................................. 335/18; 361/42
See application file for complete search history.

(56) References Cited

U.S. PATENT DOCUMENTS

| 7,944,653 | B2 * | 5/2011 | Chen et al. ....................... 361/42 |
| 2002/0180444 | A1 * | 12/2002 | Bauer ............................ 324/424 |
| 2005/0264383 | A1 * | 12/2005 | Zhang ............................... 335/18 |
| 2006/0044087 | A1 * | 3/2006 | Wang ............................... 335/18 |
| 2006/0181373 | A1 * | 8/2006 | Germain et al. ................. 335/18 |
| 2009/0184787 | A1 * | 7/2009 | Weeks et al. .................... 335/18 |
| 2010/0308943 | A1 | 12/2010 | Dobusch |

FOREIGN PATENT DOCUMENTS

| GB | 2238921 A | 6/1991 |
| JP | 11339629 A | 12/1999 |
| WO | WO 2009100470 A1 | 8/2009 |

OTHER PUBLICATIONS

European Patent Office, International Search Report in International Patent Application No. PCT/AT2011/000114 (Jun. 17, 2011).

* cited by examiner

*Primary Examiner* — Alexander Talpalatski
(74) *Attorney, Agent, or Firm* — Leydig, Voit & Mayer, Ltd

(57) ABSTRACT

A residual-current circuit breaker includes a core-balance transformer, a first conductor and a second conductor of an electrical supply system which is to be protected being routed through the core-balance transformer, and a secondary winding being arranged on the core-balance current transformer. The secondary winding is connected to a release by circuitry. A test circuit connecting the first conductor and the second conductor has at least a first test resistor and a reset button, in order to provide accurate checking of an ability of residual current tripping to function, the test circuit has a second test resistor arranged in series with the first test resistor by circuitry. The second test resistor is bridged by a bypass line that is routed through the core-balance transformer and at least one first voltage dependent resistor is arranged in the bypass line by circuitry.

12 Claims, 2 Drawing Sheets

RESIDUAL-CURRENT CIRCUIT BREAKER

CROSS REFERENCE TO RELATED APPLICATIONS

This application is a U.S. National Phase application under 35 U.S.C. §371 of International Application No. PCT/AT2011/000114, filed on Mar. 9, 2011, and claims benefit to Austrian Patent Application No. AT A 450/2010, filed on Mar. 19, 2010. The International Application was published in German on Sep. 22, 2011 as WO 2011/113072 A1 under PCT Article 21 (2).

FIELD

The invention applies to a residual-current circuit breaker.

BACKGROUND

Residual-current circuit breakers are designed to protect people and appliances from dangerous residual currents and should be tripped according to the respective, international regulations in the event of residual current occurrences, which is between half the rated residual current and the rated residual current.

Residual-current circuit breakers (RCCB) should, in addition, have a testing facility for testing functionality in accordance to the respective, international, national and/or regional regulations. The stated testing facility usually includes a test resistor and a test button, whereby the operation of the test button will close off the test circuit, and thereby a simulated residual current is produced from one conductor to another conductor past the core-balance current transformer. If the RCCB functions correctly, it will be triggered and the short circuiting of the RCCB severs the conductor of the network being protected.

According to regulations, during the operation of the testing facility, the force provoked in the core-balance current transformer must not exceed the rated residual current by more than 2.5 times the force produced by the rated residual current. In an RCCB with a residual current of 30 mA therefore, according to regulations, a rated voltage factor of up to 75 mA is allowed. A RCCB tripped during the operation of the testing phase therefore will not necessarily trigger safely in the case of a significantly smaller residual current.

The test circuit should, in addition, reliably function in an additional supply voltage area. The test circuit must function therefore at a supply voltage of 85% of the rated voltage factor, as well as in the usual fluctuations of the additional supply voltage and where applicable the line voltage of 10%. Furthermore there are four-pole RCCBs which can also be used as two-pole RCCBs. As a result of the test circuit being of the dimensions stated and this simulated residual current including the rated voltage of the rated residual current of 85%, the simulated residual current is increased by 225%, at the maximum permissible supply voltage. An RCCB which, due to a successful test with a high simulated residual current is deemed functionally safe, still may pose a risk for people or appliances, because it has not been proven that the function of the RCCB will short circuit in the case of a rated residual current.

SUMMARY

In an embodiment, the present invention provides a residual-current circuit breaker including a core-balance transformer configured to have a first conductor and a second conductor of an electrical supply system which is to be protected routed therethrough, and a secondary winding arranged on the core-balance current transformer. The secondary winding is connected to a release by circuitry. A test circuit connecting the first conductor and the second conductor has at least a first test resistor and a reset button. So as to provide accurate checking of an ability of residual current tripping to function, the test circuit has a second test resistor arranged in series with the first test resistor by circuitry. The second test resistor is bridged by a bypass line that is routed through the core-balance transformer and at least one first voltage dependent resistor is arranged in the bypass line by circuitry.

BRIEF DESCRIPTION OF THE DRAWINGS

Exemplary embodiments of the present invention are described in more detail below, with reference to the drawings, in which.

DETAILED DESCRIPTION

In an embodiment, the present invention provides an RCCB, which can reduce the problem described above and in which the capability of the residual current tripping can be more precisely measured and one which can be easily assembled.

Thereby, the capability of the residual current tripping of an RCCB as defined by the inventor can be more precisely tested than was previously possible. Thereby, the simulated residual current which is produced when the test button is operated dependent on the actual adjacent supply voltage of the RCCB will only fluctuate at rates of 10%, as opposed to fluctuations of rates of over 200%, which is the current status of technology. Thereby, when an RCCB performs successfully in a testing situation, it can be adduced that the RCCB in question will function correctly in any actual malfunctions as well as in actual triggers. Thereby, faulty RCCBs can be detected as such and can be replaced. Thereby, safety levels for people and appliances can be significantly increased.

In addition, the RCCBs in embodiments of the invention application are extremely easy to construct. Thereby, the above mentioned benefits can be easily implemented and incur only minor additional costs. Thereby, the distribution of the proposed invention can be promoted which could increase the security of many electronic systems. Due to its simple assembly, it is possible to ensure that the test circuit is completely independent of the line voltage which makes it almost fail-safe and, in addition, is approved in every country in the world.

Figure 1:
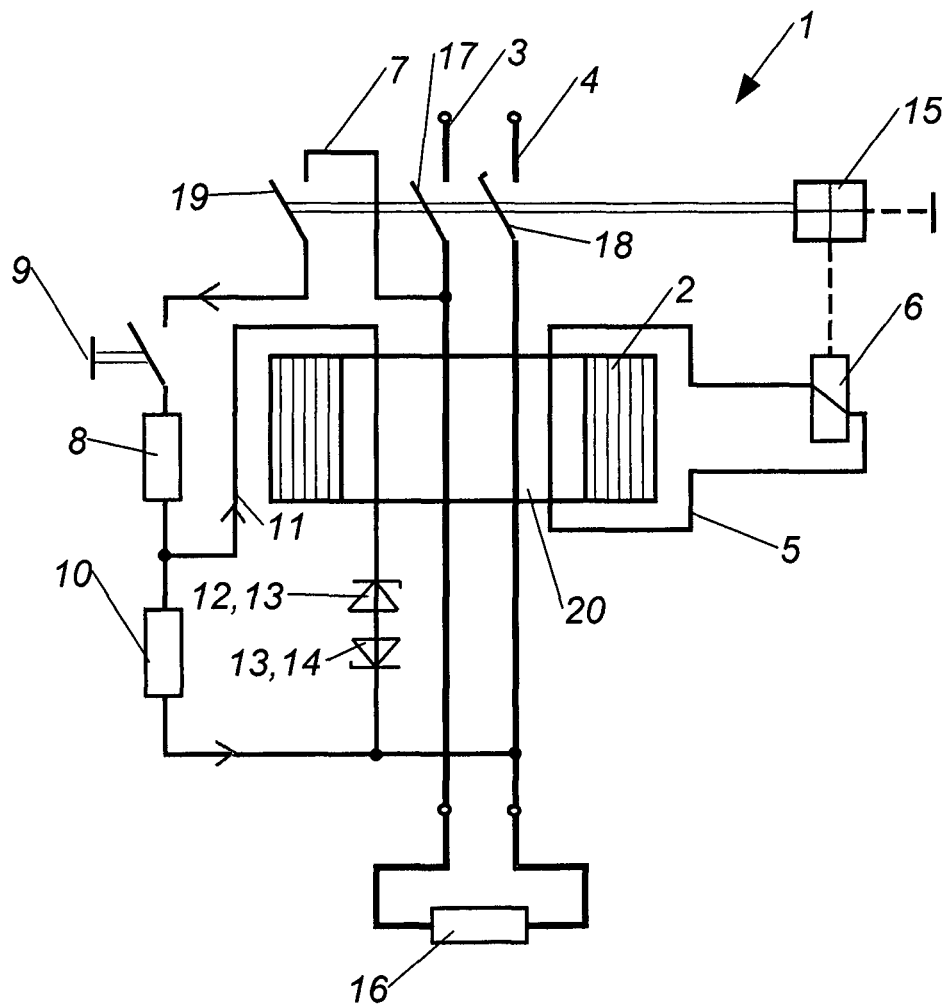
FIG. 1 shows a schematic circuit diagram of a first embodiment of an RCCB in accordance with the invention.
Figure 2:
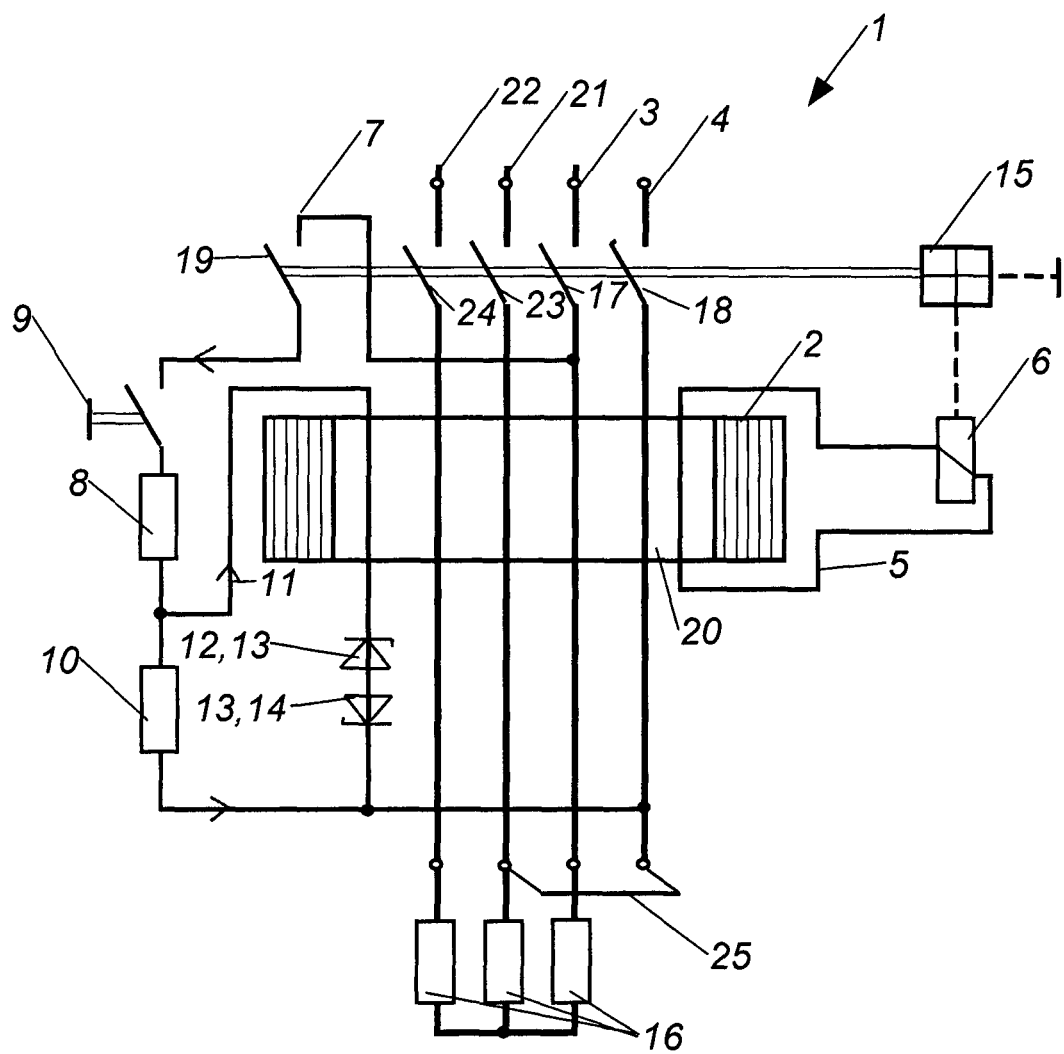
FIG. 2 shows a schematic circuit diagram of a second embodiment of an RCCB in accordance with the invention.

FIGS. 1 and 2 show preferred constructions of an RCCB (1), including at least one core-balance current transformer (2) through which at least one first conductor (3) and a second conductor (4) of an electrical supply system which is to be protected are routed, wherein at least one secondary winding (5) is arranged on the core-balance current transformer (2), wherein the secondary winding (5) is connected to a release (6) by circuitry, wherein the first conductor (3) is connected to the second connector (4) by means of a test circuit (7), which test circuit (7) has at least a first test resistor (8) and a test button (9), it is proposed that, for the purpose of accurately checking the ability of the residual current tripping means to function, the test circuit (7) has a second test resistor (10)

which is arranged in series with the first test resistor (8) by circuitry, in that the second test resistor (10) is bridged by a bypass line (11), in that the bypass line (11) is routed through the core-balance current transformer (2), and in that at least one first voltage dependent resistor (12) is arranged in the bypass line (11) by circuitry.

Thereby, the capability of the residual current tripping of an RCCB (1) constructed in the manner designed by the invention can be more precisely checked than was previously possible. Thereby, the simulated residual current which is produced when the test button (9) is operated dependent on the actual adjacent supply voltage of the RCCB will only fluctuate at rates of 10%, as opposed to fluctuation rates of over 200%, which is the current status of technology. Thereby, when an RCCB (1) performs successfully in a testing situation, it can be adduced that the RCCB (1) in question will function correctly in any actual malfunctions as well as in actual triggers. Thereby, faulty RCCBs (1) can be detected as such and can be replaced. Thereby, safety levels for people and appliances can be significantly increased.

In addition, the RCCB (1) in the invention application is extremely easy to construct. Thereby, the above mentioned benefits can be easily implemented and incur only minor additional costs. Thereby, the distribution of the proposed invention can be promoted which could increase the security of many electronic systems. Due to its simple assembly, it is possible to ensure that the test circuit (7) is completely independent of the line voltage which makes it almost fail-safe and, in addition, is approved in every country in the world.

An RCCB (1) constructed as suggested by the invention can be used on any type of RCCB (1), which means it can be used in particular in more functions and construction areas than are actually described in the current invention documentation. As FIGS. 1 and 2 show, the RCCB (1) as customized by the invention is particularly designed for use in an electrical supply system with two or, where applicable, four conductors (3), (4), (21), (22). However, construction with any possible number of conductors or, where applicable, lines of a electricity provision system and/or electricity distribution system is also possible.

An RCCB (1) as customized by an embodiment of the invention shows—in a manner known per se—at least one core-balance current transformer (2) with one converter core, comprising magnetic material, through which at least the first and second conductors (3), (4) are routed as primary winding. The term 'routed through the core-balance current transformer' refers therefore, as in the rest of the description of the invention, to the usual routing of the core-balance current transformer with a ring-shaped or annular converter core which has an opening through which conductors (3), (4), (21), (22) are routed. Ideally, these conductors (3), (4), (21), (22) are, in addition, to be routed through or wound around the cross section of this 'ring' at least once.

In addition, there is a secondary winding (5) on the core-balance current transformer, designed to detect signs of residual current. Ideally this is made up of a conductor—like a thin piece of wire—wound around the cross-section of the 'ring' several times. The secondary winding (5) is connected at least indirectly with one release (6) which ideally functions as a permanent magnet trigger, wherein a particularly secure and fast approach to the RCCB (1) is achieved. The release (6) works mechanically via a switching lock (15) to short circuit, which is shown in FIGS. 1 and 2 with a dotted line. Where there is an instance of dangerous residual current, a respective residual current signal is produced in the secondary winding (5) and the release (6) triggers the isolating contacts (17), (18), (19), (23), (24) which are opened and sever the first and second conductors (3), (4), and, where applicable, the third and fourth conductors (21), (22). Varying designs of a release (6) could be adapted, like a line voltage dependent release.

An RCCB (1) as customized by an embodiment of the invention have, in addition, a test circuit (7), which is designed and intended to produce a simulated residual current. The test circuit (7) thereby connects the first conductor (3) to the second conductor (4), wherein this connection is not routed through the core-balance current transformer (5), rather it is routed 'around' it. The test circuit (7) is not included in the regular operation of the RCCB (1). Therefore, no current flows to the test circuit (7). In order to include the test circuit (7), the test button (9) exists. In addition, the test circuit (7) has at least one first test resistor (8). When the first test resistor (8) displays resistance in the sense of the invention being described, which is basically comprised of a completely ohmic resistance, and/or at least in the frequency of the system to be protected as a completely ohmic resistance.

The test circuit (7) exhibits further, as is depicted in FIGS. 1 and 2, the ideal construction of a so-called fifth isolating contact (19), which is mechanically connected to the switching lock (15) and/or the other isolating contacts (17), (18), (23), (24) and in the event of any of them being opened, the first, second, third and/or fourth isolating contacts (17), (18), (23), (24) will also be opened. Thereby in the case of the test button (9) being activated and the resulting release of the RCCB (1), a current will flow through the test circuit (7) and the test resistor (8). A current flowing in this manner leads to significant power losses at the test resistor (8) which in turn can lead to thermal destruction of the first and second test resistors (8), (10). This can be prevented by the fifth isolating contact (19) and the first test resistor (8), and/or the second test resistor (10), can be set to the lowest permissible power losses.

An aspect of the invention is to provide the test circuit (7) with a second test resistor (10). This second test resistor (10) is similarly ideally comprised of ohmic resistance. The second test resistor (10) is technically arranged in series at the first test resistor (8) in the test circuit (7). The object of the invention is, in addition, to ensure that the second test resistor (10) is bridged by a bypass line (11). This bypass line (11) is routed through the core-balance current transformer (2), by the opening of the ring-shaped core-balance current converter (2). The bypass line (11) technically comprises at least one first voltage dependent resistor (12).

As a voltage dependent resistor (12), resistance of any type can be accommodated, whereby a voltage supplied which falls below a determined threshold level produces a high, or in particular a very high resistance, and above this threshold produces a very low resistance. In practice, this threshold can be comprised as a threshold area with a determined transitional area. Ideally, at least one first voltage dependent resistor (12) is designed as varistor and/or as a suppressor diode and/or a zener diode (13). Regarding the ideal positioning of at least one voltage dependant resistor (12) as a semi-conductor device, the so-called threshold will also be referred to as the reverse breakdown voltage. The respective construction elements, mentioned as the preferred construction, exhibit varying characteristic features, such as current/voltage curves, reverse breakdown voltage levels, drops in voltage and similar anomalies. For each actual application, therefore, the ideal construction parts which need to prioritised can be used.

Because of the technical construction customized by the invention, anything up to a particular drop in voltage of the second test resistor (10), to be determined beforehand, can be achieved, wherein the bypass line is not insulating at a high-resistance or at all up until the reverse breakdown voltage. In this case, the test circuit (7) operates as usual, although the first and second test resistors (8), (10) act as individual resistors. As soon as the voltage rate at the second test resistor (10) reaches the reverse breakdown voltage of the first voltage dependent resistor (12) and/or exceeds it, this first voltage dependent resistor (12) resists weakly and thereby forms a parallel circuit to the second test resistor (10). Wherein the bypass line (11) is routed through the core-balance current transformer (2), a part of the simulated residual current which flows through the first test resistor (8), is routed through the core-balance current transformer (2) again, wherein this partial current is not detected as residual current. Thereby, it can be achieved that the residual current actually detected by the secondary winding (5)—where the voltage differential increases between and the first and second conductors, (3), (4) does not increase further, rather it remains at a relatively constant value or area. Because of the remaining resistance, which the voltage dependent resistors (12), (14), continue to display in their operational state, and/or the drop in voltage at the semi-conductor transitional layer, part of the simulated residual current continues to flow through the second test resistor (10) and past the core-balance current transformer (2).

The size of the first and second test resistors (8), (10) as well as the choice of at least the first voltage dependent resistor (12), the size and/or height of the simulated residual current which will flow through the second test resistor (10) can be decided in advance, and is on stand-by as residual current to be detected by the secondary winding (5). According to the first preferred construction of the first and second test resistors, (8), (10), the first test resistor (8) has a value of 15k ohm and the second test resistor (10) has a value of 560 ohm. According to a second preferred construction of the first and second test resistors, (8), (10), the first test resistor (8) has a value of 4k7 ohm and the second test resistor (10) has a value of 1k5 ohm.

Embodiments described in these pages could be adjusted so that in the bypass line (11), at least one first voltage dependent resistor (12) would be arranged technically in series, providing an additional resistance. This additional resistance is primarily comprised of a conventional ohmic resistance. Thereby a drop in voltage over the total bypass line (11) will be increased and thereby the simulated residual current flowing through the second test resistor (10) can be further influenced and/or adjusted.

According to the preferred first and second constructions described in these pages, as seen in FIGS. 1 and 2, it is planned that a second voltage dependent resistor (14) can be serially located next to the first voltage dependent resistor (12) in the bypass line (11). Using this type of second voltage dependent resistor (14), the drop in voltage can be further influenced by the bypass line (11).

In addition, using a second voltage dependent resistor (14) allows the possible use of unipolar construction elements, like the formation of the first voltage dependent resistor (12) as a zener diode and the possibility of designing a respective RCCB (1) suitable for alternating voltages. In this regard, it is also possible that the second voltage dependent resistor (14) is comprised of a zener diode (13). Thereby, it is particularly advantageous when the zener diode (13) comprised first voltage dependent resistor is located in one to two voltage dependent resistors (14) where the opposite polarity is technically located in the bypass line (11).

Below, the first and second preferred constructions of the invention referred to in this application will be described respectively in detail with the help of FIGS. 1 and 2.

FIG. 1 shows only a particularly preferred initial construction of an RCCB (1) as customized by the invention for line voltage independent solutions to residual current tripping as a schematic design of a functional component. This type of RCCB (1) is designed to protect people and appliances, whereby in the case of dangerous residual current, the user or load (16) which is connected to the RCCB (1) including the first conductor (3) and the second conductor (4) are severed from the provision system. The RCCB has terminals, in particular screw connecting terminals to attach at least one first and one second conductors (3), (4) to an electrical supply system. The schematic circuit diagrams in FIG. 1 show a construction with only one first conductor and one second conductor (3), (4). Next to the first and second conductors (3), (4), the first and second isolating contacts (17), (18) are arranged, the switching contacts, which are intended and designed to sever and/or interrupt the first and/or second conductors (3), (4) as well as conduct the associated closure. The construction components and/or structural components described and sketched in FIG. 1 are housed in a casing of insulated material which has apertures for the terminals and a manually operated hand lever to open or close the first and second isolating contacts (17), (18) manually. In addition, it is possible that an RCCB (1) as customized by the invention described has further uses for structural components and construction components not highlighted or described here, perhaps in position indicating devices, a blown-fuse indicator and similar devices. FIG. 1 also shows an example of a load (16) as in an electric consumer/user.

RCCBS (1) as customized by the invention are ideally designed for line voltage independent residual-current circuit breakers. This type of line voltage independent RCCB (1) for the detection of residual current and tripping the RCCB (1), wherein the isolating contacts (17), (18) sever the connected construction components, obtain the energy required for tripping completely from the residual current and/or proportionally from the residual current signal in the secondary winding (5), and thereby supply no active electronic components such as transistors and/or operational amplifiers and no system components of such active components.

The test circuit (7) is connected to the first conductor (3) and runs through the afore-mentioned isolating contact (19) wherein it is connected to the test button (9). The test button (9) is further connected conductively to the first test resistor (8), the other connection of which is also electrically connected to the second test resistor (10) as well as the bypass line (11). The other connection of the second test resistor (10) is electrically connected to the second conductor (4) as well as to the bypass line (11). In the bypass line (11), a first and second voltage dependent resistor (12), (14) are arranged, both of which are comprised of zener diode (13). The respective zener diodes (13) are thereby located in the bypass line reversely polarized.

FIG. 2 shows a second preferred construction of an RCCB (1) as customized by the invention, which differs from the first preferred construction as shown in FIG. 1 in the further addition of a third and fourth conductor (21), (22), located next to which are the isolating contacts (23), (24). The second and third conductors (4), (21) are electrically connected to the load-bearing side of the core-balance current transformer by a bridge (25). The rest of the construction of the RCCB (1) is identical to that in FIG. 1.

Further construction models of the RCCB as customized by the invention only show parts of the features described, though every combination of features, in particular those of variously described design elements can be adapted or designed.

While the invention has been particularly shown and described with reference to preferred embodiments thereof, it will be understood by those skilled in the art that various changes in form and details may be made therein without departing from the spirit and scope of the invention.

The invention claimed is:

1. A residual-current circuit breaker comprising:
   at least one core-balance transformer configured to have a first conductor and a second conductor of an electrical supply system which is to be protected routed therethrough;
   at least one secondary winding arranged on the core-balance current transformer, the secondary winding being connected to a release by circuitry;
   a test circuit connecting the first conductor and the second conductor, the test circuit having at least a first test resistor and a reset button, wherein, so as to provide accurate checking of an ability of residual current tripping to function, the test circuit includes a second test resistor arranged in series with the first test resistor by circuitry, the second test resistor being bridged by a bypass line, the bypass line being routed through the core-balance transformer, and at least one first voltage dependent resistor being arranged in the bypass line by circuitry.

2. The residual-current circuit breaker recited in claim 1, wherein the first voltage dependent resistor includes a varistor.

3. The residual-current circuit breaker recited in claim 1, wherein the first voltage dependent resistor is a suppressor diode.

4. The residual-current circuit breaker recited in claim 1, wherein the first voltage dependent resistor is a zener diode.

5. The residual-current circuit breaker recited in claim 1, wherein the second voltage dependent resistor is serially located next to the first voltage dependent resistor in the bypass line.

6. The residual-current circuit breaker recited in claim 2, wherein the second voltage dependent resistor is serially located next to the first voltage dependent resistor in the bypass line.

7. The residual-current circuit breaker recited in claim 3, wherein the second voltage dependent resistor is serially located next to the first voltage dependent resistor in the bypass line.

8. The residual-current circuit breaker recited in claim 4, wherein the second voltage dependent resistor is serially located next to the first voltage dependent resistor in the bypass line.

9. The residual-current circuit breaker recited in claim 5, wherein the second voltage dependent resistor is a zener diode.

10. The residual-current circuit breaker recited in claim 9, wherein the first voltage dependent resistor is a zener diode and is located next to the second voltage dependent resistor in the bypass line with opposite polarity.

11. The residual-current circuit breaker recited in claim 1, wherein the first voltage dependent resistor is serially connected next to the bypass line so as to provide additional resistance.

12. The residual-current circuit breaker recited in claim 1, wherein the residual-current circuit breaker is line voltage independent.

* * * * *